United States Patent [19]

Pena

[11] Patent Number: 5,680,032

[45] Date of Patent: Oct. 21, 1997

[54] WIND-POWERED BATTERY CHARGING SYSTEM

[75] Inventor: Mario Pena, Houston, Tex.

[73] Assignee: Spinmotor, Inc., Houston, Tex.

[21] Appl. No.: 574,521

[22] Filed: Dec. 19, 1995

[51] Int. Cl.$^6$ .................................................. H02J 7/32
[52] U.S. Cl. ......................... 320/61; 290/55; 322/2 R
[58] Field of Search ................................ 320/5, 61, 62, 320/63; 322/2 R, 35; 290/55, 44, 1 R

[56] References Cited

U.S. PATENT DOCUMENTS

| | | | |
|---|---|---|---|
| 757,800 | 4/1904 | Williams . | |
| 3,248,967 | 5/1966 | Lewis | 74/572 |
| 3,444,946 | 5/1969 | Waterbury | 180/65 |
| 3,556,239 | 1/1971 | Sparks | 180/65 |
| 3,672,244 | 6/1972 | Nasvytis | 74/899 |
| 3,878,913 | 4/1975 | Lionts et al. | 180/65 R |
| 3,970,409 | 7/1976 | Luchuk | 416/145 |
| 4,002,218 | 1/1977 | Horvat | 180/165 |
| 4,012,163 | 3/1977 | Baumgartner et al. | 415/2 |
| 4,075,545 | 2/1978 | Haberer | 320/61 |
| 4,141,425 | 2/1979 | Treat | 180/65 |
| 4,168,759 | 9/1979 | Hull et al. | 180/65 |
| 4,254,843 | 3/1981 | Han et al. | 180/165 |
| 4,314,160 | 2/1982 | Boodman et al. | 290/55 |
| 4,423,368 | 12/1983 | Bussiere | 322/35 |
| 4,498,015 | 2/1985 | Gottfried | 290/15 |
| 4,632,205 | 12/1986 | Lewis | 180/165 |
| 5,214,333 | 5/1993 | Kawamura | 310/153 |
| 5,269,197 | 12/1993 | Yang | 74/572 |
| 5,280,827 | 1/1994 | Taylor et al. | 180/165 |

FOREIGN PATENT DOCUMENTS

| | | |
|---|---|---|
| 877563 | 7/1941 | France . |
| 2498532 | 1/1981 | France . |
| 2665413 | 8/1990 | France . |
| 2820628 | 11/1979 | Germany . |
| 58-56943 | 4/1983 | Japan . |
| 572826 | 1/1976 | Switzerland . |
| 2013597 | 2/1979 | United Kingdom . |

OTHER PUBLICATIONS

Paul Gipe, Wind Power for Home & Business, Real Goods Book Co., 1993 pp. 102–105, 108–109, 115.
Frank R. Eldridge, Wind Machine (2nd ed,) 1980, Van Nostrand Reinhold Company, pp. 40, 137, 139.
Paul Rosenberg, Alternative Energy Handbook 1993, The Fairmont Press, Inc. p. 231.
Paul G. Hewitt, Conceptual Physics, 1978, Addison–Wesley Publishing Co. pp. 300–302, 318, 22.
Nicholes P. Cheremisinoff, Fundamentals of Wind Energy, Ann Arbor Science Publishers, Inc. (1979), pp. 61, 62.

*Primary Examiner*—Edward Tso
*Attorney, Agent, or Firm*—Madan & Morris, PLLC

[57] ABSTRACT

During forward motion of an electrically-powered vehicle, air is captured at the front of the vehicle and channeled to one or more turbines. The air from the turbines is discharged at low pressure regions on the sides and/or rear of the vehicle. The motive power of the air rotates the turbines, which are rotatably engaged with a generator to produce electrical energy that is used to recharge batteries that power the vehicle. The generator is rotatably engaged with a flywheel for storing mechanical energy while the vehicle is in forward motion. When the vehicle slows or stops, the flywheel releases its stored energy to the generators, thereby enabling the generator to continue recharging the batteries. The flywheel enables the generators to provide a more stable and continuous current flow for recharging the batteries.

30 Claims, 3 Drawing Sheets

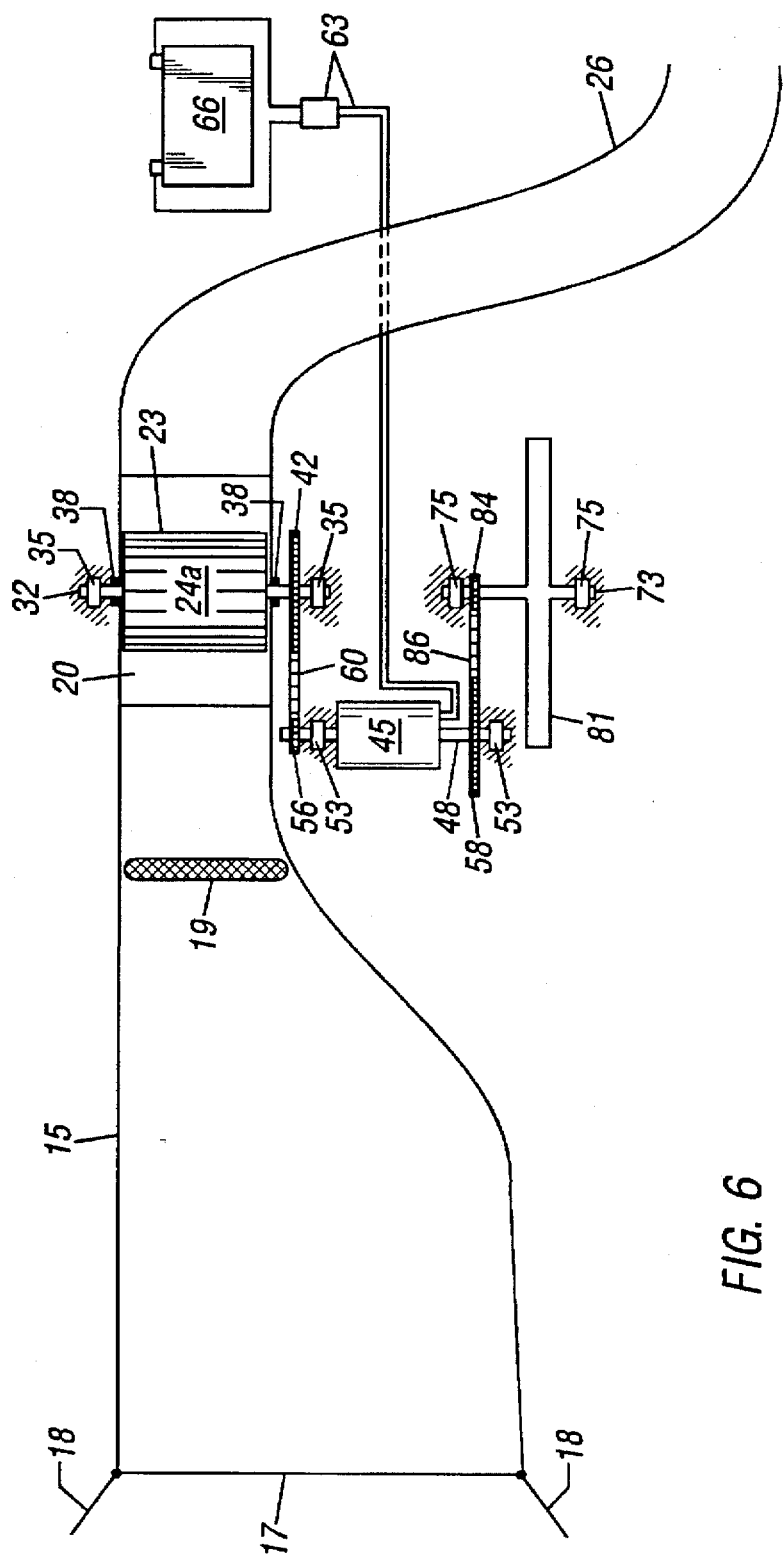

5,680,032

WIND-POWERED BATTERY CHARGING SYSTEM

BACKGROUND OF THE INVENTION

1. Field of the Invention

This invention relates generally to an electrically powered vehicle and more particularly to a system for charging batteries which utilizes a wind-operated turbine and generator for charging the batteries while the vehicle is in motion and a flywheel for charging the batteries when the vehicle slows down or is stopped.

2. Description of the Related Art

Environmental pollution, noise and depletion of crude oil reserves due to the increasing use of gasoline-powered vehicles continue to be of significant concern. Electrically-powered vehicles are known to solve some of the problems associated with the gasoline-powered vehicles, but such vehicles are not yet in widespread use. Electrically-powered vehicles have certain drawbacks as compared to vehicles powered by conventional gasoline engines. Significant drawbacks include limited travel range between battery recharging and excessive time required for recharging the batteries. The average travel distance between battery recharging for currently available electrically powered vehicles is considerably less than the gasoline powered vehicles. Also, it usually takes several hours to recharge the batteries while the vehicle remains inoperative.

Increasing the travel range of electrically-powered vehicles between downtimes for battery recharging can significantly increase the use of electrically-powered vehicles. The range of electrically-powered vehicles can be increased by charging the batteries while the vehicle is in motion. This has typically been accomplished by utilizing air currents as a motive power.

For example, U.S. Pat. No. 5,280,827 issued to Taylor et. al. discloses a long Venturi tube extending along an upper portion of a vehicle that directs air flow from the front of the vehicle to a large wind turbine mounted at the rear of the vehicle. The wind turbine rotates about an axis perpendicular to the axis of the vehicle body. A pair of elongated lower screw-type turbines are contained in separate lower venturi effect tubes extending along the lower side of the vehicle below the passenger cab and discharge so as to aid in the rotation of the large, rear-mounted wind turbine.

U.S. Pat. No. 4,423,368 issued to Bussiere discloses an air duct extending from an inlet along the roof section of a vehicle body above the windshield and over the passenger compartment to air outlets located in the rear fender wells of the vehicle. Air turbines, operatively connected to electric generators, are positioned at the air outlets and are driven by air currents flowing from the duct. Additionally, U.S. Pat. No. 4,254,843 issued to Han et. al. teaches a whirl ventilator system to produce a whirling air flow that rotates a fan to drive an alternator such that air flow from the movement of the vehicle generates electricity to charge batteries. The batteries are connected to an electric motor which rotates a drive shaft, which is coupled to a driven shaft through a clutch mechanism. The driven shaft rotates an axle via a conventional differential mechanism. The clutch mechanism has a flywheel mounted about it, and the flywheel is rotatively engaged with an electric generator.

U.S. Pat. No. 4,168,759 issued to Hull, deceased et. al. discloses an impeller mounted nearly horizontal in a chamber above the passenger compartment of an automobile. The chamber has an opening in its front for receiving air and a rear exit vent. The impeller is rotated by air forced through the chamber and mechanically coupled to a generator to provide auxiliary power for the automobile.

Although, the above-noted and other patents have contributed to the art of electrically-powered vehicles, significant improvements are needed to solve the short travel distance problems associated with such vehicles. The present invention addresses the above-noted problem and provides a system for efficiently charging batteries while the vehicle is in motion and when the vehicle is intermittently stopped.

SUMMARY OF THE INVENTION

The present invention provides a wind-powered battery charging system for an electrically-powered vehicle having a front, opposing longitudinal sides, a rear, and at least one battery for storing and providing electrical energy. The battery charging system comprises: a duct oriented generally longitudinally in the vehicle, the duct comprises a funnel-shaped air intake duct having a forward opening located in the front of the vehicle for receiving air, an air discharge duct having an air outlet, and a turbine chamber located therebetween; a turbine rotatably secured in the turbine chamber, the turbine having an axis of rotation about a vertical axis; a generator operatively engaged with the turbine; a flywheel operatively engaged with the generator for storing mechanical energy when excess energy is provided by the turbine to the generator and releasing energy when inadequate energy is provided by the turbine to the generator; and electrical circuitry operatively connecting the generator to the battery for recharging the battery.

In a preferred embodiment of the battery charging system, the turbine rotates about a turbine shaft having a turbine gear; the generator is operatively mounted on a generator shaft; the flywheel rotates about a flywheel shaft having a flywheel gear; a first generator gear is mounted on the generator shaft and operatively engaged with the turbine gear; and a second generator gear is mounted on the generator shaft and operatively engaged with the flywheel gear. Preferably, the turbine gear, the first generator gear, the second generator gear, and the flywheel gear are each sized to optimize the rotational speed of its respective component, wherein the turbine gear is larger than the first generator gear, and the gear ratio between the turbine gear and the first generator gear is between one and fifty. Likewise, it is preferred that the second generator gear is larger than the flywheel gear, wherein the gear ratio between the second generator gear and the flywheel gear is between one and fifty.

The battery charging system may include a housing for the flywheel for sealing the flywheel, wherein the flywheel is contained in a reduced atmosphere, and it may further include a catastrophe-containment device for safely containing the flywheel.

The air outlet may be located in the rear of the vehicle, and it may be flared outward. A heat transfer element may be located in the air intake duct. In an alternative embodiment, the air discharge duct is "Y" shaped with air outlets located on the opposing sides of the vehicle.

In one aspect the invention provides a method for charging a battery in an electrically-powered vehicle having a front, opposing longitudinal sides, a rear, and at least one battery for storing and providing electrical energy. The method comprises: capturing air at the front of the vehicle as the vehicle moves in a forward direction; passing the captured air rearward through a duct in the vehicle to a turbine chamber; rotating a turbine in the turbine chamber with the captured air; exhausting the captured air through an air discharge duct to an air outlet; generating electricity in a generator operatively engaged with the turbine; recharging the battery with the electricity generated in the previous step; storing mechanical energy in a flywheel that is operatively engaged with the generator; and releasing stored energy in the flywheel to the generator for generating electricity.

In another aspect the invention provides an improvement to a wind-powered battery charging system for an electrically-powered vehicle having a forward facing air intake duct, an air exhaust duct, a turbine chamber therebetween, a generator operatively engaged with the turbine and means for the generator to recharge batteries that store energy and provide power to the vehicle. The improvement comprises: a flywheel rotatively engaged with the generator for receiving and storing mechanical energy from the generator and for releasing stored energy to the generator, wherein the gear ratio between the turbine and the generator is between one and fifty; the gear ratio between the generator and the flywheel is between one and fifty; and the air exhaust duct discharges air through an air outlet located in a region defined by the rear of the vehicle and a wave vortex that forms behind the vehicle when the vehicle moves forward, so that the air exhausts into a relatively low-pressure region. The battery charging system may further include a heating element in the air intake duct, and the air discharge duct may be "Y" shaped and discharge air on opposing sides of the vehicle so as to take advantage of a Bernoulli effect.

Examples of the more important features of the invention thus have been summarized rather broadly in order that detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 5 shows a partial elevational view of an air intake duct, turbine, generator, and flywheel according to an embodiment of the present invention.

FIG. 6 shows a cross-section of a flywheel placed in a housing that is placed in a catastrophe-containment device.

DESCRIPTION OF THE PREFERRED EMBODIMENT

Figure 1:
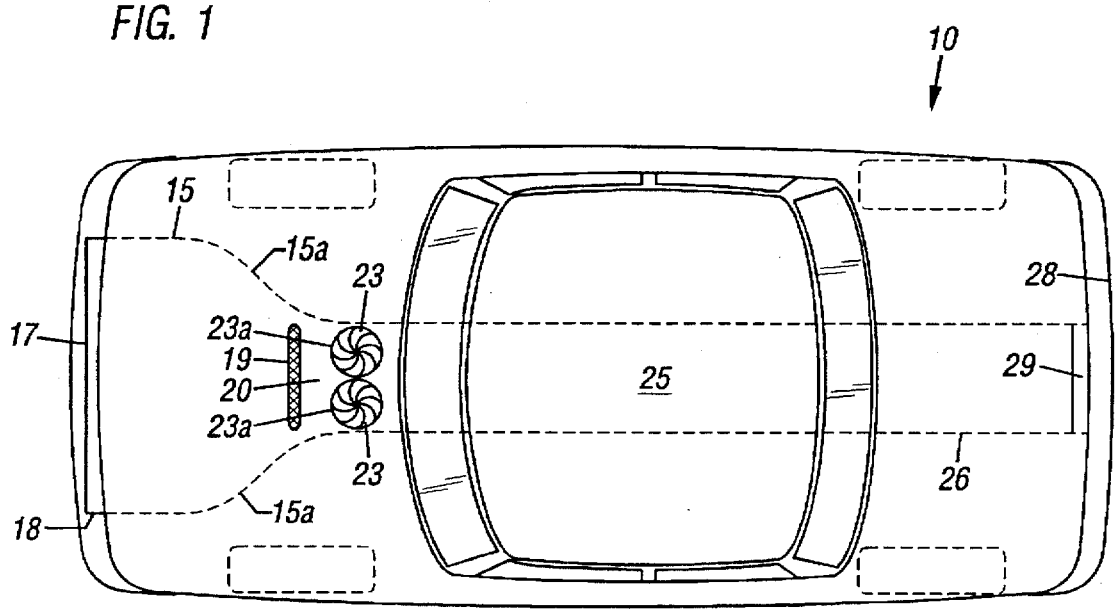
FIG. 1 shows a top view of an electrically-powered vehicle having a duct for channeling air to turbines, according to one embodiment of the present invention.
Figure 2:
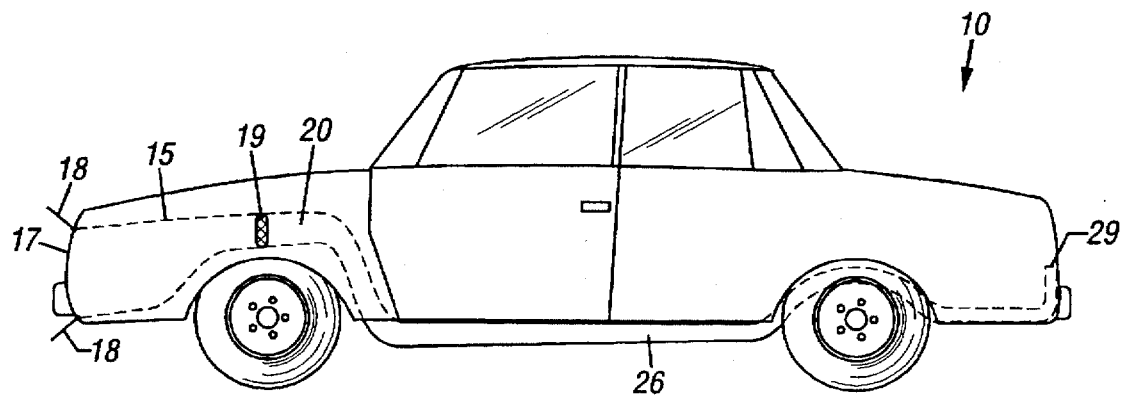
FIG. 2 shows a side view of the duct placed in the vehicle shown in FIG. 1.
Figure 3:
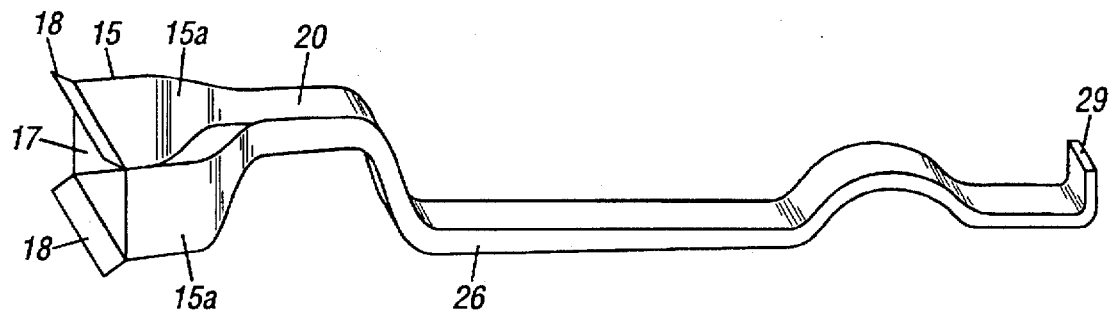
FIG. 3 is an isometric view of an air intake duct, turbine chamber, and air exhaust duct, according to one embodiment of the invention.

FIG. 1 shows a top view of an electrically-powered vehicle 10 having a duct for channeling air to turbines, according to one embodiment of the present invention. FIG. 2 shows a side view of the duct placed in the vehicle shown in FIG. 1. FIG. 3 is an isometric view of the air intake duct, turbine chamber, and air exhaust duct, according to one embodiment of the invention. Referring to FIGS. 1–3 the vehicle 10 has an air intake duct 15 disposed longitudinally within the vehicle 10. As the vehicle 10 moves in a forward direction, air or wind enters a forward opening 17 of the air intake duct 15. The air intake duct 15 is preferably funnel shaped from its forward opening 17 to a turbine chamber 20. The cross-sectional area of the air intake duct 15 is greatest at its forward opening 17 and decreases in the direction of the air flow from the forward opening 17 to the turbine chamber 20. As best seen in FIG. 3, one or more adjustable scoops 18 may be used to adjust the wind intake into the intake duct to a desired volume. For example, it may be desirable to increase the wind intake at low vehicular speeds and to decrease the wind intake at high vehicular speeds, so as to regulate the air flow into the turbine chamber 20.

As air flows through the air intake duct 15, it is compressed and accelerated by the converging walls 15a of the air intake duct 15 and passed to the turbine chamber 20. In an alternative embodiment, a heat transfer element 19 may be placed at a suitable place in the air intake duct for heating, and thereby expanding, the incoming air prior to discharging the air into the turbine chamber.

One or more than one turbines 23 are placed in the turbine chamber 20 and have blades 23a designed to operatively engage the air flowing through the turbine chamber 20. The turbines 20 preferably rotate about their respective vertical axis. Air flowing into the turbine chamber 20 impinges on the blades 23a of the turbines 23 and applies a force that causes the turbines 23 to rotate. Although the embodiment of FIG. 1 shows two side-by-side placed turbines, the number of turbines utilized and their relative placement in the turbine chamber 20 will depend upon the design criteria used.

An air discharge duct 26 extends rearward from the turbine chamber 20 to an air outlet 29. Air, having passed through the turbines 23, is discharged into the air discharge duct 26, from where it is discharged into the atmosphere via the air outlet 29. The cross-sectional area of the air discharge duct 26 is greater than the exhaust outlet of the turbine chamber 20 so as to minimize pressure in the air discharge duct 26.

In one embodiment, the air outlet 29 is located in the rear of the car so that the air is discharged in a region of lower air pressure as compared to the air pressure in the forward opening 17 of the air intake duct 15. A wave vortex of air currents forms at the rear of a car being driven in a forward direction. Air outlet 29 is preferably located in the region defined by the rear of the vehicle 10 and the wave vortex because that region has a lower pressure than other surfaces of the vehicle 10. By discharging the air into a region of lower pressure than the pressure at the forward opening 17 of the air intake duct 15, an aspiration effect is introduced which increases the flow of air through the turbines 23. The flow of air through the turbines 23 may also be increased by flaring out the air discharge duct 26 at the air outlet 29, which further reduces the air discharge pressure.

Figure 4:
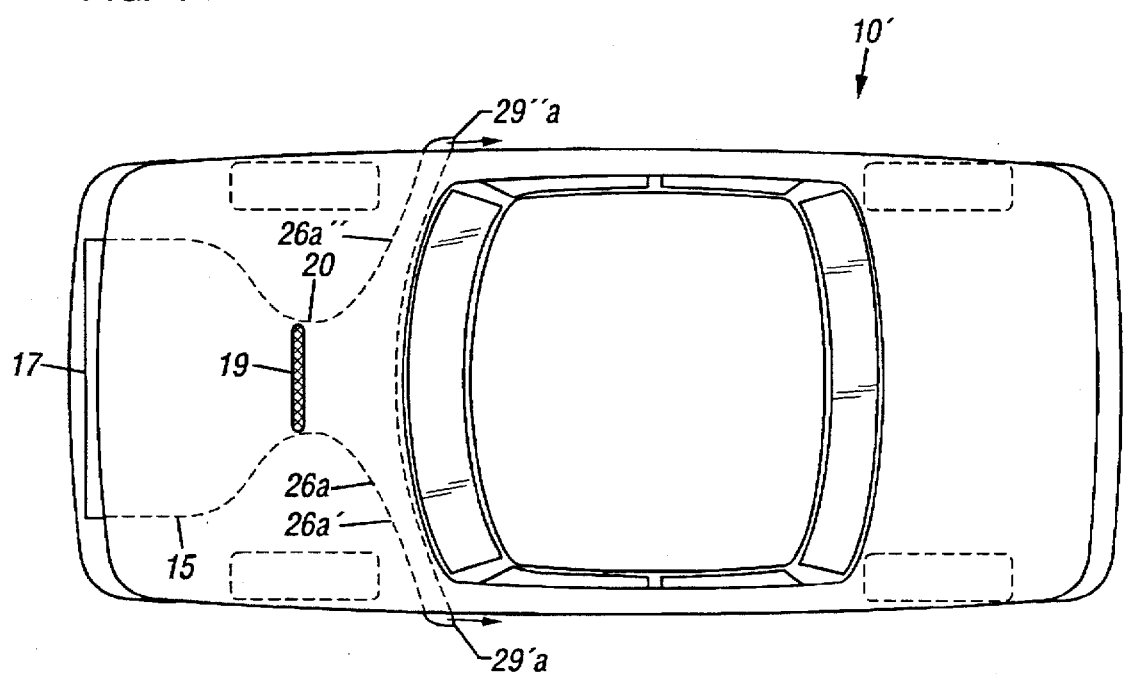
FIG. 4 is a top view of an electrically-powered vehicle, according to an alternative embodiment of the invention.

FIG. 4 shows an alternative embodiment for discharging exhaust air from the turbine chamber 20 into the atmosphere. In such an embodiment, the air discharge duct 26 is split to discharge the air from the turbine chamber to either side of the vehicle 10'. For example, the discharge duct may be split to form a "Y" shape to provide two air ducts 26a' and 26a"

to discharge the exhaust air to their respective air outlets 29a' and 29a" located on opposite sides of the vehicle 10'. The air outlets 29 are shaped and positioned to provide an aspiration effect to take advantage of the Bernoulli effect. This provides a lower discharge pressure for the turbines 23, which optimizes the rotational energy imparted to the turbines 23 by the air flowing therethrough.

FIG. 5 shows a partial elevational view of an air intake duct, turbine, generator, and flywheel according to an embodiment of the present invention. FIG. 6 shows a cross-section of a flywheel placed in a housing that is placed in a catastrophe-containment device. Referring to FIGS. 5–6, the turbines 23 rotate about an upright turbine shaft 32, which is supported by bearing supports 35. The bearing supports 35 are fastened to the vehicle 10 for support. Where the upright turbine shaft 32 passes through upper and lower surfaces of the turbine chamber 20, a seal 38 is provided to prevent air leakage, but yet allow the upright turbine shaft 32 to rotate freely. A turbine gear 42 is fastened to the upright turbine shaft 32.

A generator 45 is positioned near the turbines 23. One generator 45 is preferred, but the invention is operative with more. The generator 45 has an armature within fastened to an upright generator shaft 48. Generator bearing supports 53 secure the generator 45 by securing the upright generator shaft 48 to the vehicle 10. A first generator gear 56 and a second generator gear 58 are secured to the upright generator shaft 48. A turbine chain 60 is rotatively engaged with the turbine gear 42 and the first generator gear 56 for transferring rotational energy from the turbines 23 to the generator 45. Thus, as the turbines 23 are rotated by air flowing through them, the rotational energy imparted to the turbines 23 is transferred to the generator 45 by the turbine chain 60.

The rotational energy imparted to the first generator gear 56 is transferred through the upright generator shaft 48 to the armature within the generator 45, causing the armature to rotate. The rotation of the armature within the generator 45 causes the generator 45 to generate electricity. The generator 45 is operatively connected by electrical circuitry 63 to storage batteries 66. The electricity generated by the generator 45 charges the storage batteries 66.

Still referring to FIG. 5, the various components cooperate to provide an energy-efficient system. The storage batteries 66 provide electrical energy for powering the electrical vehicle 10. As the vehicle 10 is driven in a forward direction, air or wind is channeled through the forward opening 17 of the air intake duct 15 to the turbines 23, causing them to rotate. That rotational energy is transferred, via the turbine chain 60, to the armature within the generator 45, where the rotation of the armature causes the generator 45 to generate electricity, which is used to recharge the storage batteries 66. Thus, a clean, energy-efficient, self-contained, closed-loop system is provided.

This system is improved by providing a flywheel 70 positioned near the generator 45. One flywheel 70 is preferred, but the invention is operative with more. As seen best in FIG. 6, the flywheel 70 is secured to and rotates about an upright flywheel shaft 73. Flywheel bearing supports 75 support and secure the upright flywheel shaft 73, yet allow it to rotate freely. The flywheel bearing supports 75 are themselves secured to the vehicle 10, thereby securing the flywheel 70. The flywheel 70 is maintained in a reduced atmosphere by sealing it in a housing 77 as shown in FIG. 6. The housing 77 minimizes wind resistance, allowing the flywheel 70 to operate more efficiently. Where the upright flywheel shaft 73 passes through upper and lower surfaces of the housing 77, a housing seal 79 maintains the reduced atmosphere, but yet allows the upright flywheel shaft 73 to rotate freely. For safety, the flywheel 70 is further contained in a catastrophe-containment device 81 that applies emergency braking and/or captures the flywheel if the vehicle becomes involved in a collision.

A flywheel gear 84 is secured to the upright flywheel shaft 73. A flywheel chain 86 is rotatively engaged with the flywheel gear 84 and the second generator gear 58. As the vehicle 10 is engaged in forward motion, a portion of the rotational energy transferred to the upright generator shaft 48 is, in turn, transferred to the flywheel 70 via the flywheel chain 86. The flywheel 70 stores mechanical energy in its rotation, while the generator 45 produces electric current for charging the storage batteries 66. As the vehicle 10 slows or stops, the air flow to the turbines 23 decreases, decreasing the rotational energy provided by the turbines 23. Without the flywheel 70, the generator 45 would quickly stop charging the storage batteries 66. However, the flywheel 70 continues to rotate when the vehicle 10 slows down or stops after being driven in a forward direction because mechanical energy had been stored in the rotation of the flywheel. This stored energy is transferred, via the flywheel chain 86, from the flywheel 70 to the generator 45, enabling the generator 45 to continue to produce electric current for charging the storage batteries 66. Thus, the flywheel 70 smooths out the flow of electric current generated by the generator 45, which provides more efficient charging of the storage batteries 66.

The various gears are sized to optimize the rotational speeds of their respective components. The turbine gear 42, which drives the generator 45 via the turbine chain 60 connected to the first generator gear 56, has a greater diameter than the first generator gear 56. One complete rotation of the turbine gear 42 results in from one to fifty complete rotations of the first generator gear 56, preferably ten. Similarly, the second generator gear 58, which drives the flywheel 70 via the flywheel chain 86, has a greater diameter than that of the flywheel gear 84. One rotation of the second generator gear 58 results in from one to fifty rotations of the flywheel gear 84, preferably twenty.

In a preferred embodiment, the gear ratio between the turbine gear 42 and the first generator gear 56 is ten; and likewise, the gear ratio between the second generator gear 58 and the flywheel gear 84 is ten. This gear combination rotates the flywheel 70 faster than either the turbines 23 or the generator 45, which is an efficient way to store energy in the flywheel 70. Depending on whether the vehicle 10 is being driven in a forward direction or slowing or stopping, the flywheel gear 84 may be either a driven gear or a driver gear, respectively. In either case, the second generator gear 58 and the flywheel gear 84 turn at their relative speeds because they are directly coupled by the turbine chain 60.

The present invention is illustrated by way of the foregoing description, and various modifications will be apparent to those skilled in the art in view thereof. It is intended that all such variations within the scope and spirit of the appended claims be embraced thereby.

What is claimed is:

1. An electrically-powered vehicle having a front, rear, opposing longitudinal sides, and a battery for storing and providing electrical energy, comprising:
   (a) a duct assembly comprising:
      (i) an air intake duct;
      (ii) a turbine chamber having a turbine chamber inlet and exhaust outlet;
      (iii) a discharge duct; and (iv) a discharge outlet, wherein the intake duct is connected to the turbine chamber inlet, the discharge duct is interposed between the turbine chamber exhaust outlet and the discharge outlet, and, the discharge duct has a larger cross sectional area than the turbine chamber exhaust outlet;

(b) a turbine placed in the turbine chamber, said turbine adapted to operate by the air passing through the duct when the vehicle is in motion; and (c) a generator operatively engaged with the turbine, said generator providing electrical energy and charging the battery with the generated electrical energy when the turbine is in operation.

2. An electrically-powered vehicle having a front, rear, opposing longitudinal sides, and a battery for storing and providing electrical energy, comprising:

(a) a duct assembly comprising:

(I) an air intake duct having a forward opening;

(ii) a turbine chamber having a turbine chamber inlet and exhaust outlet;

(iii) a discharge duct; and (iv) a discharge outlet, wherein the intake duct is connected to the turbine chamber inlet, the discharge duct is interposed between the turbine chamber exhaust outlet and the discharge outlet, and, the discharge duct has a larger cross sectional area than the turbine chamber exhaust outlet;

(b) a turbine placed in the turbine chamber, said turbine adapted to operate with the air passing through the duct when the vehicle is in motion;

(c) a generator operatively engaged with the turbine, said generator providing electrical energy and charging the battery with the generated electrical energy when the turbine is in operation; and (d) a flywheel operatively engaged with the generator for storing mechanical energy when the turbine is in operation.

3. The apparatus of claim 2 further having a circuitry operatively connecting the generator to the battery for recharging the battery.

4. The apparatus of claim 2, wherein the turbine rotates in a horizontal plane.

5. The apparatus of claim 2, wherein the turbine is engaged with the generator by a gear arrangement.

6. The apparatus of claim 5, wherein the generator is engaged with the flywheel by a gear arrangement.

7. The apparatus of claim 6, wherein the flywheel is placed in an enclosure.

8. The apparatus of claim 7, wherein the enclosure is substantially sealed from the outside air.

9. The apparatus of claim 7, wherein the flywheel rotates in a horizontal plane.

10. The apparatus of claim 5, wherein the gear arrangement provides a gear ratio of at least ten between the turbine and the generator.

11. The apparatus of claim 6, wherein the gear arrangement provides a gear ratio of at least ten between the generator and the flywheel.

12. The apparatus of claim 6 further comprising a catastrophe-containment device for safely containing the flywheel.

13. The apparatus of claim 2, wherein the discharge outlet is located in the rear of the vehicle.

14. The apparatus of claim 2, wherein the discharge outlet is adapted to discharge air on the opposing longitudinal sides of the vehicle.

15. The apparatus of claim 14, wherein the discharge duct is "Y" shaped with discharge outlets located on the opposing sides of the vehicle.

16. The apparatus of claim 14 further having an heating element for heating the air in the intake duct before it reaches the turbine.

17. The apparatus of claim 2, wherein the forward opening has a substantially greater cross-section than the discharge outlet.

18. The apparatus of claim 17, wherein the forward opening has an adjustable flap for adjusting air flow into the duct when the vehicle is in motion.

19. A wind-powered battery charging system for an electrically-powered vehicle having a front, opposing longitudinal sides, a rear, and at least one battery for storing and providing electrical energy, the battery charging system comprising:

(a) a duct assembly, oriented generally longitudinally in the vehicle, comprising:

(I) an air intake duct having a funnel shaped air intake with a forward opening in the front of the vehicle;

(ii) a turbine chamber having a turbine chamber inlet and exhaust outlet;

(iii) a discharge duct; and (iv) a discharge outlet, wherein the intake duct is connected to the turbine chamber inlet, the discharge duct is interposed between the turbine chamber exhaust outlet and the discharge outlet, and, the discharge duct has a larger cross sectional area than the turbine chamber exhaust outlet;

(b) a turbine adapted to rotate about a vertical axis placed in the turbine chamber;

(c) a generator operatively engaged with the turbine, said generator providing electrical energy when the turbine is in operation;

(d) a flywheel operatively engaged with the generator for storing mechanical energy when excess energy is provided by the turbine to the generator and releasing energy when inadequate energy is provided by the turbine to the generator; and (e) electrical circuitry operatively connecting the generator to the battery for recharging the battery.

20. The battery charging system of claim 19 wherein:

the turbine rotates about a turbine shaft having a turbine gear;

the generator is operatively mounted on a generator shaft;

the flywheel rotates about a flywheel shaft having a flywheel gear;

a first generator gear is mounted on the generator shaft and operatively engaged with the turbine gear; and a second generator gear is mounted on the generator shaft and operatively engaged with the flywheel gear.

21. The battery charging system of claim 20, wherein the gear ratio between the turbine gear and the first generator gear is at least ten.

22. The battery charging system of claim 21, wherein the gear ratio between the second generator gear and the flywheel gear is at least ten.

23. The battery charging system of claim 19, further comprising a housing for the flywheel for sealing the flywheel, wherein the flywheel is contained in a reduced atmosphere.

24. The battery charging system of claim 19, wherein the air outlet is located in the rear of the vehicle.

25. The battery charging system of claim 19, wherein the air discharge duct is "Y" shaped with air outlets located on the opposing sides of the vehicle.

26. The battery charging system of claim 19, further comprising a heat transfer element for heating air passing through the turbines.

27. In an electrically-powered vehicle having a front, opposing longitudinal sides, a rear, and at least one battery for storing and providing electrical energy, a method for charging the battery, comprising:

(a) capturing air at the front of the vehicle as the vehicle moves in a forward direction;

(b) passing the captured air rearward through a duct in the vehicle to a turbine chamber;

(c) rotating a turbine in the turbine chamber having a turbine chamber exhaust outlet with the captured air;

(d) exhausting the captured air through an air discharge duct having a larger cross sectional area than the turbine chamber exhaust outlet to an air outlet;

(e) generating electricity in a generator operatively engaged with the turbine;

(f) recharging the battery with the electricity generated in the previous step;

(g) storing mechanical energy in a flywheel that is operatively engaged with the generator; and (h) releasing stored energy in the flywheel to the generator for generating electricity.

28. A wind-powered battery charging system for an electrically-powered vehicle having a forward facing air intake duct, an air discharge duct, a turbine chamber having a turbine chamber exhaust outlet therebetween, the air discharge duct having a larger cross sectional area than the turbine chamber exhaust outlet, a generator operatively engaged with the turbine and means for the generator to recharge batteries that store energy and provide power to the vehicle, comprising:

(a) a flywheel rotatively engaged with the generator for receiving and storing mechanical energy from the generator and for releasing stored energy to the generator, wherein the gear ratio between the turbine and the generator is between one and fifty and the gear ratio between the generator and the flywheel is between one and fifty; and (b) the air exhaust duct discharges air through an air outlet located in a region defined by the rear of the vehicle and a wave vortex that forms behind the vehicle when the vehicle moves forward, so that the air exhausts into a relatively low-pressure region.

29. The battery charging system of claim 28, further comprising a heating element in the air intake duct.

30. The battery charging system of claim 28, wherein the air discharge duct is "Y" shaped and discharges air on opposing sides of the vehicle so as to take advantage of a Bernoulli effect.

* * * * *